United States Patent
Brezny et al.

(10) Patent No.: US 6,204,219 B1
(45) Date of Patent: Mar. 20, 2001

(54) THERMALLY STABLE SUPPORT MATERIAL AND METHOD FOR MAKING THE SAME

(75) Inventors: Rasto Brezny, Catonsville; Manoj M. Koranne, Clarksville, both of MD (US)

(73) Assignee: W. R. Grace & Co.-Conn., New York, NY (US)

( * ) Notice: Subject to any disclaimer, the term of this patent is extended or adjusted under 35 U.S.C. 154(b) by 0 days.

(21) Appl. No.: 09/363,505

(22) Filed: Jul. 29, 1999

(51) Int. Cl.$^7$ .................................................. B01J 23/00
(52) U.S. Cl. .......................... 502/304; 423/263; 423/593; 423/608; 501/103; 501/152; 502/303
(58) Field of Search ..................................... 502/304, 303; 423/593, 608, 263; 501/152, 103

(56) References Cited

U.S. PATENT DOCUMENTS

| | | | |
|---|---|---|---|
| 4,940,685 | * 7/1990 | Sauvion et al. | 502/304 |
| 5,389,352 | * 2/1995 | Wang | 423/263 |
| 5,529,969 | 6/1996 | Bonneau et al. . | |
| 5,532,198 | 7/1996 | Chopin et al. . | |
| 5,543,126 | * 8/1996 | Ota et al. | 423/263 |
| 5,607,892 | 3/1997 | Chopin et al. . | |
| 5,626,826 | 5/1997 | Chopin et al. . | |
| 5,693,299 | 12/1997 | Chopin et al. . | |
| 5,712,218 | 1/1998 | Chopin et al. . | |
| 5,732,101 | * 3/1998 | Cuif | 423/592 |
| 5,747,401 | * 5/1998 | Cuif | 501/103 |
| 5,888,464 | * 3/1999 | Wu et al. | 502/304 |
| 5,908,800 | * 6/1999 | Bonneau et al. | 501/103 |
| 5,945,370 | * 8/1999 | Yokoi et al. | 502/304 |
| 5,958,827 | * 9/1999 | Suda et al. | 502/304 |
| 5,976,476 | * 11/1999 | Blanchard et al. | 423/213.2 |
| 5,989,507 | * 11/1999 | Sung | 423/213.5 |
| 6,034,029 | * 3/2000 | Wulff-Doring et al. | 502/308 |
| 6,051,529 | * 4/2000 | Brezny | 502/302 |
| 6,068,828 | * 5/2000 | Hata et al. | 423/608 |
| 6,103,660 | * 8/2000 | Yperen et al. | 502/327 |

FOREIGN PATENT DOCUMENTS

| | | | |
|---|---|---|---|
| 778071 | 6/1997 | (EP) | B01D/53/94 |
| 4-055315 | 2/1992 | (JP) | C01F/17/00 |
| 5531592 | 2/1992 | (JP) . | |
| WO 9743214 | 11/1997 | (WO) | C01G/25/00 |
| WO 9820968 | 5/1998 | (WO) | B01J/21/04 |
| WO 9845212 | 10/1998 | (WO) | C01G/25/02 |

* cited by examiner

Primary Examiner—Tom Dunn
Assistant Examiner—Cam N. Nguyen
(74) Attorney, Agent, or Firm—Robert A. Maggio; Beverly J. Artale

(57) ABSTRACT

A process for the preparation of mixed oxide compositions of cerium oxide and at least one non-noble metal oxide is disclosed. The process involves contacting a salt solution containing a cerium (IV) salt with hydrogen peroxide and thereafter, treating the resulting solution with excess base to precipitate a mixed oxides. Mixed oxide compositions produced by the process maintain a high specific surface area after prolonged exposure to high temperatures.

17 Claims, No Drawings

THERMALLY STABLE SUPPORT MATERIAL AND METHOD FOR MAKING THE SAME

FIELD OF THE INVENTION

The present invention relates to novel compositions based on mixed oxides of cerium oxide and at least one non-noble metal oxide. The novel oxide compositions exhibit a high specific surface area and excellent heat resistance.

In particular, this invention relates to a process for the preparation of the oxide compositions, and to the use thereof as catalyst and/or catalyst supports for the purification and/or conversion of exhaust gases from internal combustion engines.

BACKGROUND OF THE PRIOR ART

Cerium oxide and zirconium oxide are known compounds that are particularly useful constituents, either alone or in combination, in a wide variety of catalyst compositions, e.g., multifunctional catalyst compositions, especially catalysts suited for the treatment or conversion of exhaust gases emanating from internal combustion engines. By "multifunctional" is intended a catalyst capable of effecting not only the oxidation, in particular, of carbon monoxide and of hydrocarbons present in the exhaust gas, but also the reduction of the oxides of nitrogen also present in such gas ("three-way" catalysts).

To meet stringent air emissions regulations, catalysts are being placed closer and closer to the engine thus subjecting them to higher temperatures. In order to maintain their effectiveness, they should not sinter and loose surface area. Consequently, there exists a need for catalysts that maintain high surface area even after prolonged exposure to temperatures of 900° C.

Further, when a catalyst structure consists of a mixture of various catalytic components, such as ceria and zirconia, it follows that a more intimate mixture of the components will result in a more effective catalyst structure.

Attempts to prepare mixed oxides of cerium and zirconium having a high and thermally stable surface area are known. For example, U.S. Pat. No. 5,717,218 discloses a thermally-stable, high surface area ceria-zirconia mixed oxide having a pure monophasic $CeO_2$ crystalline habit. The mixed oxides are prepared by subjecting a mixture of oxide solutions to thermohydrolysis, preferably in a nitrogen atmosphere and under pressure, to form the desired oxide. This process is undesirable since it is time consuming and requires expensive equipment such as high pressure reactors.

U.S. Pat. No. 5,532,198 also discloses a process of preparing a high surface area cerium/zirconium mixed oxide. The oxides are prepared by admixing a zirconium sol with a cerium sol, spray drying the admixture and calcining the dried material. The process requires that the ratio of the mean size of the zirconium sol particle to the mean size of the cerium sol be within a specified range in order to obtain a product having a sufficiently high surface area.

It has also been proposed in Japanese Patent Application No. (Kokai) 55,315/1992 to prepare fine powders of cerium oxide and zirconium oxide having a high specific surface area and excellent heat resistance by a coprecipitation process. The powders are prepared by mixing a water-soluble zirconium salt with a water soluble salt of cerium (III) or cerium (IV) to form a mixed salt solution, and thereafter treating the salt solution with excess base to precipitate a mixed oxide powder. Where the cerium salt is a cerium (III) salt, the Japanese reference teaches adding hydrogen peroxide to the salt solution simultaneous or subsequently with the precipitation step to oxidize the trivalent cerium to the tetravelant state. The highest surface area reported for cerium/zirconium powders produced in accordance with the process disclosed in this reference was only 26.5 $m^2/g$.

SUMMARY OF THE INVENTION

To overcome the deficiencies hereto associated with prior processes and mixed oxide compositions, the present invention provides a simple, economical and novel process for the preparation of compositions based on mixed oxides of cerium and other non-noble metals. The process provides high surface area oxide compositions via a coprecipitation method without the need for expensive high pressure techniques.

The process of the present invention includes the steps of treating a homogeneous, aqueous solution of a cerium IV salt and at least one non-noble metal salt with an aqueous hydrogen peroxide solution. The peroxide treated solution is thereafter coprecipitated with an excess of a base. The precipitate is filtered, washed and spray dried to form a powder. The dried powder is calcined to convert the resulting hydroxide particles to particles of cerium oxide and at least one non-noble metal oxide.

The present invention also provides improved mixed oxide compositions for promoting oxidation formed by the process above. The oxide composition possesses a specific surface area of greater than 100 $m^2/g$ and maintains an increased surface area after prolonged exposure to thermal conditions. Advantageously, the oxide compositions of the invention are intimately mixed as exhibited by X-ray diffraction techniques.

The process and compositions of the present invention provide a catalyst/catalyst support having outstanding durability under harsh conditions at elevated temperatures. The catalyst/catalyst supports produced in accordance with the present invention have a decreased loss in surface area under thermal conditions when compared to catalyst/catalyst supports prepared using oxide powders produced by earlier processes.

DETAILED DESCRIPTION OF THE INVENTION

The process for the preparation of the mixed oxide composition according to the invention will now be more fully described.

As indicated above, the first stage of the process of the invention entails preparing a mixture comprising a homogeneous, aqueous salt solution of a cerium IV salt and at least one non-noble metal salt. The aqueous solution is obtained by preparing individual solutions of a water-soluble cerium IV salt and the desired non-noble metal salts and then mixing, in any order, said solutions.

Salts useful in the process of the present invention herein include any aqueous soluble salt of cerium IV and the desired non-noble metals. Suitable salts include, but are not limited to, nitrates and sulfates. The nitrates are preferred herein. Aqueous nitrate solutions can be obtained, for example, by reacting nitric acid with the suitable hydrated compound, e.g. cerium (IV) hydroxide.

Cerium (IV) salts useful in the process of the invention may contain, without disadvantage, a small amount of cerium in the cerous state. Preferably, the cerium IV salts contain at least 85% of cerium IV, most preferably greater than 95% of cerium IV.

Suitable non-noble metal salts useful in the invention include, without limitation, salts of transition metals, rare earth metals, and combinations thereof. In a preferred embodiment of the invention, the non-noble metal salt is a salt having a non-noble metal component selected from the group consisting of zirconium and a rare earth metal. In a more preferred embodiment of the invention, the non-noble metal salt is zirconium salt used alone or in combination with a salt of lanthanum, yttrium, praeseodymium, or mixtures thereof.

The amount of cerium, zirconium and rare earth metal salts used to prepare the salt solution useful in the process of the invention will vary depending upon the desired concentration of oxides in the final mixed oxide composition. Generally, the amount of cerium, zirconium and rare earth metal salt will correspond to the stoichiometric proportions of mixed oxides in the final compositions.

In a second stage of the process according to the invention, the salt solution is treated with an aqueous solution of hydrogen peroxide. In general, hydrogen peroxide is added in an amount equal to the weight of oxides desired in the final oxide composition. Preferably the amount of hydrogen peroxide is at least 2.5 moles per molar equivalent of cerium in the salt solution; most preferably the amount of hydrogen peroxide added to the aqueous solution is about 2.5 to about 4.5 moles per molar equivalent of cerium in the salt solution.

The peroxide treated salt solution is thereafter treated with a base to coprecipitate the corresponding hydroxide. Suitable bases include, for example, a solution of ammonia or alkali metal hydroxides, e.g., sodium, potassium, and the like. The preferred base is aqueous ammonia.

In general, the base is added to the peroxide treated salt solution in an excess. Preferably, the amount of base added to the peroxide treated solution is in the range of about 4 to about 8 moles per moles cation, preferably, about 5 to about 6 moles per moles of cation, to provide a final pH of greater than about 8.0.

The temperature at which the precipitation step is conducted ranges from about 20° C. to about 100° C. Preferably, the temperature ranges from about 60° C. to about 80° C.

Preferably the pH of the reaction medium is maintained between 8 to 9 during precipitation.

Following addition of the base, the precipitate is optionally aged at a temperature range of about 80° C. to about 100° C. for about 0.5 to about 6 hours. Preferably, the precipitate is aged at a temperature of about 90° C. for about 2 hours. The pH of reaction medium is maintained at greater than 7.5 during the aging process.

At the end of the precipitation step, a solid product is recovered which can be separated from the reaction medium using conventional solid/liquid separation techniques such as, for example, filtration, settling, decanting or centrifugation.

The recovered product is subjected to washings which are preferably carried out using deionized water. To eliminate residual water, the washed product is dried at a temperature ranging from about 90° C. to about 350° C., preferably from about 100° C. to about 200° C. In a preferred embodiment, the washed product is dried by spray drying.

Lastly, the recovered product, after washing and/or drying if appropriate, may be calcined. Generally, the recovered product is calcined at a temperature ranging from about 400° C. to about 800° C. for about 1 to about 6 hours. Preferably, the recovered product is calcined at a temperature ranging from about 500° C. to about 600° C. for about 2 to about 4 hours.

Mixed oxide powders produced by the process of the present invention are comprised of particles of cerium oxide and at least one non-noble metal oxides selected from the group consisting of transition metal oxides, rare earth metal oxides and mixtures thereof. Preferably, the non-noble metal oxide is selected from the group consisting of zirconium oxide, a rare earth oxide and mixtures thereof. Preferred rare earth oxides include, but are not limited to, lanthanide, yttria, praeseodymia, or mixtures thereof.

Mixed oxide compositions of the invention comprise about 20 to about 80 weight % $CeO_2$ and about 20 to 80 weight % non-noble metal oxide, preferably, about 30 to about 70 weight % $CeO_2$ and about 30 to about 70 weight % non-noble metal oxide, most preferably, about 40 to about 60 weight % $CeO_2$ and about 60 to about 40 weight % non-noble metal oxide, In a preferred embodiment, the composition include about 40 to about 60 weight % $ZrO_2$, about 60 to 40 weight % $CeO_2$, and 0 to 20 rare earth metal oxide, e.g., lanthana or yttria. In still a more preferred embodiment, the composition include about 45 to about 55 weight % $ZrO_2$, about 55 to 45 weight % $CeO_2$, and 0 to 10% rare earth metal, e.g., lanthana or yttria.

Mixed oxide compositions prepared by the process of the invention have an initial BET specific surface area of about 40 to about 150 $m^2/g$. Even after calcination or aging at high temperatures, e.g., about 800° C. to about 900° C., for extended periods of time, e.g., about 2 to about 6 hours, the composition according to the invention retain an exceptionally high BET specific surface area of at least 30 $m^2/g$.

The remarkably high and thermally stable specific surface areas of the mixed oxide compositions prepared according to the invention permit them to be used for numerous applications. They are particularly well suited for catalysis applications, as catalysts and/or as catalyst supports. Notably, they can be employed as catalysts or catalyst supports for carrying out a wide variety of reactions such as, for example, dehydration hydrosulfurization, hydrodenitrification, desulfurization, hydrodesulfurization, dehydrohalogenation, reforming, vapor-reforming, hydrocracking, hydrogenation, dehydrogenation, isomerization, dismutation, oxychlorination, dehydrocyclization of hydrocarbons or other organic compounds, oxidation and/or reduction reactions, the Claus reaction, the treatment of exhaust gases from internal combustion engines, methanation, shift conversion, and the like.

One of the most important applications for mixed oxide compositions according to the invention, as emphasized above, is their use as constituents of catalysts intended for the treatment or conversion of exhaust gases emanating from internal combustion engines. For this application, the mixed oxide compositions of the invention are generally admixed with alumina before or after impregnation by catalytically active elements, such as precious metals. Such mixtures are then either shaped to form catalysts, for example in the form of beads, or used to form a lining of a refractory body such as a ceramic or metallic monolith, this lining per se being well known to this art as a "washcoat".

In order to further illustrate the present invention and the advantages thereof, the following specific examples are given. The examples are given as specific illustrations of the claimed invention. It should be understood, however, that the invention is not limited to the specific details set forth in the examples. All part and percentages in the examples as well as the remainder of the specification are by weight unless otherwise specified.

In the examples which follow, all surface areas are understood to be expressed as the B.E.T. specific surface as determined by nitrogen adsorption in accordance with ASTM standards.

EXAMPLE 1

A mixed oxide composition comprising 42 wt % $ZrO_2$, 56 wt % $CeO_2$, and 2 wt % lanthana was prepared in accordance with the invention.

The procedure involves dissolving cerium (IV) hydroxide (46.5 g) in concentrated nitric acid (74.0 g) to make an aqueous solution of cerium (IV) nitrate. The solution was completely transparent and had a dark cranberry color. An aqueous solution of zirconyl nitrate (104.0 g) was added to provide 42 wt % of zirconia in the final product. Lanthanum nitrate (3.5 g) was added. At this point a transparent aqueous solution of cerium, zirconium and lanthanum nitrates which had a red-orange color was obtained. To this solution was added a 30% solution of an aqueous hydrogen peroxide in an amount of 2.5 moles per molar equivalent of cerium in the salt solution.

The peroxide treated nitrate solution was coprecipitated in a vessel with 5N ammonia (500 ml). A temperature of 70° C. and pH between 8–9 was maintained. After all of the solution had been added the precipitate was aged at 90° C. and pH>8 for 4 hours.

The precipitate was filtered, washed with 3 Vol.Eq. of 70° C. water and spray dried. The dried powder was calcined at 500° C. for 1 hour to yield a product having surface area of 125 $m^2/g$. After aging at 900° C. for 4 hours in air the powder had a surface area of 44 $m^2/g$.

COMPARATIVE EXAMPLE 1

The procedure of Example 1 was repeated except the aging step at 90° C. for 4 hours was replaced by a 70° C. hold for 30 minutes of the precipitate in the mother liquor. The surface area of the 900° C. powder after aging for 4 hours was 28 $m^2/g$.

COMPARATIVE EXAMPLE 2

The procedure for Example 1 was repeated except no peroxide was added. The precipitate was aged at 90° C. for 4 hours. The surface area of the powder after aging at 900° C. for 4 hours was 29 $m_2/g$.

COMPARATIVE EXAMPLE 3

The procedure of Example 1 was repeated except only half the peroxide was added until the solution became clear. The surface area of the powder after aging at 900° C. for 4 hours was 21 $m^2/g$.

COMPARATIVE EXAMPLE 4

A cerium (III) nitrate solution was prepared by dissolving 58 g of cerium carbonate in 135 g water and 43 g concentrated nitric acid. To this was added 107.7 g zirconyl nitrate (20 wt % oxide) and 3.5 g lanthanum nitrate to yield 2 wt % $La_2O_3$ in final product. No hydrogen peroxide was added. The nitrates were coprecipitated as in Example 1. The surface area of the powder after aging at 900° C. for 4 hours was 20 $m^2/g$.

COMPARATIVE EXAMPLE 5

The procedure of Example 5 was repeated except 50g of hydrogen peroxide was added to the precipitate. The surface area of the powder after aging at 900° C. for 4 hours was 21 $m^2/g$.

While the invention has been described in terms of various preferred embodiments, the skilled artisan will appreciate that various modifications, substitutions, omissions, and changes may be made without departing from the spirit thereof.

What is claimed is:

1. A process for preparing a mixed metal oxide of cerium oxide and at least one other non-noble metal oxide, the process comprising:

preparing a homogeneous, aqueous solution of a cerium IV salt and at least one non-noble metal salt;

contacting the salt solution with an aqueous hydrogen peroxide solution in an amount of at least about 2.5 moles per molar equivalent of cerium;

treating the peroxide-treated solution with an excess of a base to precipitate a cerium hydroxide and at least one non-noble metal hydroxide;

washing and drying the precipitate; and calcining the precipitate at a temperature sufficient to form a mixed metal oxide of cerium oxide and at least one non-noble metal oxide, wherein the mixed metal oxide is in the form of particles and the particles have a specific surface area of at least 30 $m^2/g$ after heat treatment at 900° C. for 4 hours.

2. The process of claim 1, wherein the cerium IV salt is selected from the group consisting of nitrates and sulfates.

3. The process of claim 1, wherein the non-noble metal salt is selected from the group consisting of nitrates and sulfates.

4. The process of claim 1, wherein the non-noble metal oxide is selected from the group consisting of transition metal oxides, rare earth metal oxides, and mixtures thereof.

5. The process of claim 1, wherein the salt solution is contacted with aqueous hydrogen peroxide solution in an amount ranging from about 2.5 to about 4.5 moles per molar equivalent of cerium.

6. A mixed metal oxide composition formed by the process of claim 1.

7. A catalyst/catalyst support comprising the mixed metal oxide composition of claim 6 coated onto a substrate.

8. The catalyst/catalyst support of claim 7 having a noble metal catalyst deposited onto the mixed metal oxide composition.

9. The process of claim 1 wherein said at least one non-noble metal oxide comprises about 10 to about 90 wt % of the total mixed metal oxide.

10. The process of claim 9, wherein the non-noble metal oxide is selected from the group consisting of zirconium oxide, a rare earth metal oxide and mixtures thereof.

11. The process of claim 10, wherein the non-noble metal oxide is zirconium oxide.

12. The process of claim 11, wherein the non-noble metal oxide further comprises a rare earth metal oxide.

13. The process of claim 12, wherein the rare earth metal oxide is selected from the group consisting of lanthana, yttria, praeseodymia, or mixtures thereof.

14. A mixed metal oxide composition formed by the process of claim 12.

15. The mixed metal oxide composition of claim 14, wherein the weight percentage of zirconium oxide in the composition is between about 20 and about 80 and the weight percentage of rare earth metal oxide is between about 0 to 20.

16. A catalyst/catalyst support comprising the mixed metal oxide composition of claim 14 coated onto a substrate.

17. The catalyst/catalyst support of claim 16 having a noble metal catalyst deposited onto the mixed metal oxide composition.

* * * * *